Nov. 4, 1969     L. J. JACKSON     3,476,012
ARMING WIRE ASSEMBLY
Filed April 10, 1968
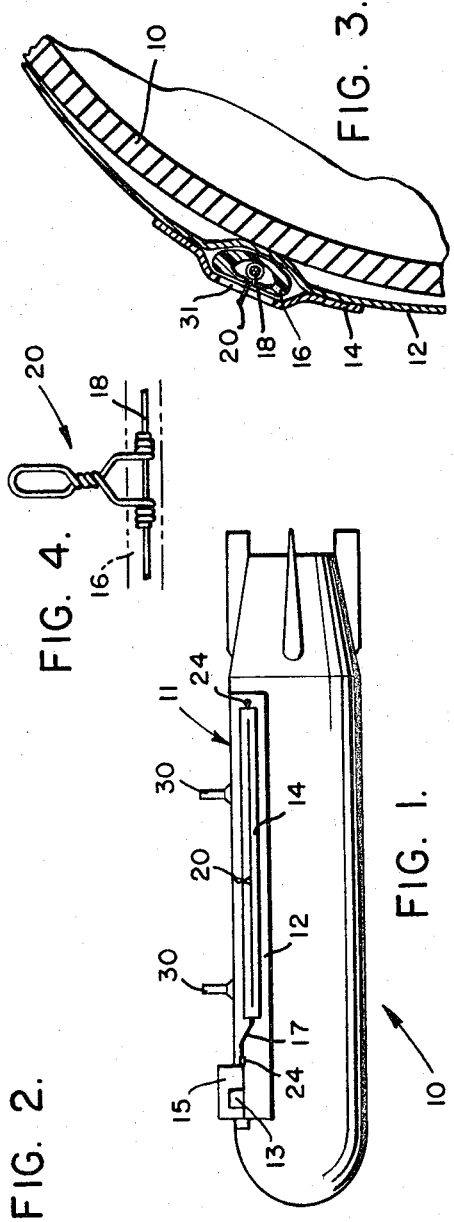
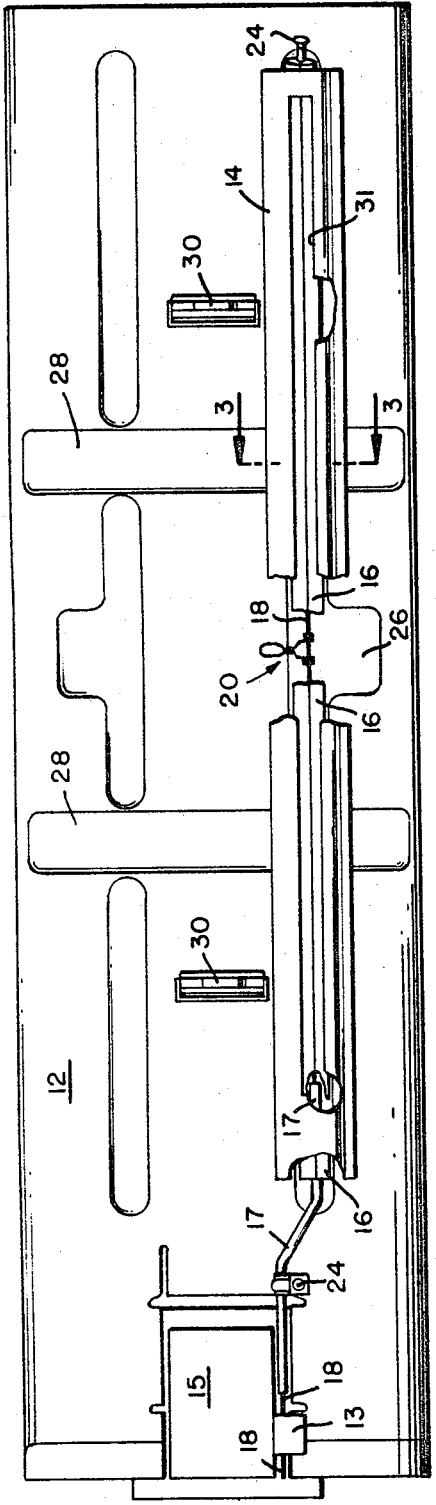
INVENTOR.
LLOYD J. JACKSON
BY ROY MILLER
ATTORNEY.
GERALD F. BAKER
AGENT.

United States Patent Office 3,476,012
Patented Nov. 4, 1969

3,476,012
ARMING WIRE ASSEMBLY
Lloyd J. Jackson, China Lake, Calif., assignor to the United States of America as represented by the Secretary of the Navy
Filed Apr. 10, 1968, Ser. No. 720,171
Int. Cl. F41f 5/02
U.S. Cl. 89—1.5   3 Claims

ABSTRACT OF THE DISCLOSURE

A safety or arming wire arrangement between two separable objects comprises a connecting slider which may be moved along the wire. The wire is protected by a slotted tubular retainer and connection may be made anywhere along the slot. The arrangement is so designed that the arming wire remains with one of the objects while the slider is retained by the other object.

Background of the invention

This invention relates to safety wire removal from an instrumentality on a first object when the first object is separated from a second object. The invention is here described in its application to a conventional releaseable weapon or other device carried on an aircraft bomb rack. Such racks are usually provided with a pair of attachment hooks, each hook releasably engaging an eye or suspension lug fixed to the bomb or other devices to be delivered by the aircraft.

When the device is released from the aircraft, the arming wire is pulled free from a fuse, timer or the like, to permit the deployment, actuation, or arming, for example, of the device. As indicated, however, the invention as presently conceived is not limited to separation of a device from an aircraft but could be effectively used in the separation of other objects, for example, to portions of a two-stage rocket or the like.

When such an assembly is used between objects traveling at a high speed through the atmosphere it is necessary to provide means to shield the arming wire from severe aerodynamic stress which might cause damage to the wire or an unintentional release of the mechanism. In most cases it is also highly desirable to retain the arming wire with the weapon after release from an aircraft because an arming wire left with an aircraft whips against the airframe with the potential of damaging the aircraft. When an arming wire system is designed with such requisites and desiderata in mind, it is very difficult to also include system flexibility. That is, it has been difficult to provide such a system which can be easily connected to various aircraft without lengthening the connecting lanyard with the same undesirable effects as though the wiring wire were left with the aircraft. One example of an earlier attempt to obtain system flexibility may be found in U.S. Patent No. 3,326,083 issued to E. L. Johnson, June 20, 1967, wherein a retainer for the arming wire may be notched at several different places to enable the device to be used in conjunction with bomb racks on various types of aircraft.

According to the present invention, such a system is provided which is easily variable for use in various applications without further modification, is completely protected against aerodynamic stresses, is reliable in operation over a great environmental range and may be easily applied to thin skinned aerial packages such as cargo delivery systems and flares.

Brief description of the several views of the drawings

FIG. 1 is an overall side view of the protected arming wire system as applied to a typical free-fall aerial package;

FIG. 2 is a planned view with portions cut away for clarity;

FIG. 3 is a cross sectional view of a detail taken along line 3—3 of FIG. 2; and FIG. 4 is an enlarged detailed view illustrating the connection of the rider with the arming wire.

Detailed description of the invention

The aerial delivery system 10, shown in FIG. 1, may be attached to a delivery aircraft by means of attachment lugs 30. Since the system shown in a thin skinned device, a strong back 11 is provided. This strong back 11 carries the attachment lugs 30 and also the arming wire assembly 14. The strong back is fastened to the weapon by means of bands (not shown) which securely attach the strong back to the weapon. The aerial package in this instance includes a timer 15 having an enabling device 13 attached thereto. The enabling device 13 is adapted to be held inoperative when the arming wire 18 is in place. When the arming wire 18 is withdrawn, the resulting release of mechanism 13 enables the timer 15 to initiate a series of events necessary to accomplish the mission of the aerial device.

As seen in FIGS. 2 and 3, the arming wire 18 is encased throughout most its length in a slotted plastic member 16, lying in an indented portion of strong back 12 and held in place by a sheet metal retaining member 14. The retaining member 14 is slotted throughout most of its length as shown at 31. The slotted member 16 is of tubular plastic material and has an inside diameter which will accommodate the feet of the slider 20 with slight friction. Slider 20 is formed with a loop to facilitate attachment to the conventional lanyard found on aircraft bomb racks and, when in position in the plastic tube 16, protrudes from the slot as shown in FIG. 3.

Between the member 14 and the mechanism 13 the arming wire 18 is protected by a metal tubing 17 which is held in place on strong back 12 by means of a clamp 24. Thus, the arming wire is protected against aerodynamic stresses throughout its entire length. The arming wire 18 is fastened at its other end by means of attachment 24 in a conventional manner.

If desired the tubing 16 may be notched, in the vicinity of the central depression 26 in strong back 12, and the member 14 also suitably notched, so that the rider 20 may lay flat until placed in use.

In practice, the strong back 12 is attached to a device having a fuse or arming device 13 to accommodate an arming wire. The package is attached to the aircraft by means of lugs 30 and the slider 20 is moved along the slot in tubing 16 until it is in a convenient position to be attached to the conventional lanyard. When the pilot is ready to deliver the aerial package, a release mechanism is actuated in a well known manner to release the lugs 30 from the rack. The lanyard which is firmly fixed to the airplane and to rider 20 forces the rider 20 to pull straight out of tubing 16 by deformation of the tubing in warmer climatic conditions or by breaking the tubing under conditions of extreme cold. As will be seen from viewing FIG. 3, the slot 31 is wide enough to accommodate either the deformation of tubing 16 or breakage thereof for release of rider 20. As rider 20 is pulled straight out of tubing 16, arming wire 18 is, accordingly, pulled out and against forces acting at attachment 24 and in mechanism 13. Since the force required to pull arming wire 18 out of mechanism 13 is much less than the force required to pull the wire from attachment 24, the arming wire is pulled from mechanism 13 and rider 20 then rides free of the arming wire leaving the arming wire on the delivery package.

Thus, it will be seen from the foregoing that the invention provides an arming wire protected from the air stream, elements and accidental snagging; having satisfactory performance over a wide range of temperatures; having a great range of variable positions for the slider to accommodate a greater variety of uses; and presenting a low silhouette configuration adaptable to numerous bomb and rack designs.

Further, it has been found, that should the arming wire 18 be mishandled in some way so that a kink is formed in the wire the flexible spring design of the slider allows it to pass over these kinks satisfactory.

Although the flexible tubing has been described as being of plastic, it is not intended that the invention should exclude the possibility of using metals, for example extruded aluminum tubing. In a particular example tested, wherein the tubing was manufactured of ABS[1], it was found that an 18 to 30 pound pull was necessary to withdraw the slider from the tube for a range of temperatures between $-324°$ and $+200°$ F.

Obviously many modifications and variations of the present invention are possible in the light of the above teachings. It is, therefore, to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed is:

1. In a release and trip mechanism of the type which provides for the separation of a first object from a second object while in motion and for the actuation of a trip mechanism incident to said separation and including a lanyard means on the first of said objects and attachment means for the lanyard on the other object, wherein the trip mechanism is adapted to be held in a safe or inoperable condition by a moving arming wire or cable adapted to be removed from the trip mechanism upon separation of the objects; an improved arming wire assembly comprising:

arming wire enclosing means attached to one of said objects including;

an elongated attachment plate having a slot throughout most of its length, a plastically deformable slotted tube;

said tube being attached to said one of said objects by said plate so that the slot in said tube underlies the slot in said plate;

said arming wire being enclosed in said tube, fastened at one end to said one of said objects and adapted to have the other end inserted in a trip mechanism;

a slider slidably engaging said wire in said tube and having a loop protruding through said slot for attachment to conventional lanyard means;

whereby said slider may be moved along said slot in said tube for attachment to any of variously positioned lanyard means.

2. The device of claim 1 further including:

said slotted member having a centrally located cutout portion; and said fastening means also having a coincidental cutout portion to allow said slider to lie flat.

3. The device of claim 1 wherein the physical properties and dimensions of said slotted tube and said slider are so constituted that the amount of pull necessary to dislodge said slider from said tube will be greater than the pull necessary to dislodge said lanyard means from said first object so that said second object may be jettisoned without removing said wire from said trip means.

References Cited

UNITED STATES PATENTS

| | | | |
|---|---|---|---|
| 3,326,083 | 6/1967 | Johnson | 89—1.5 |
| 3,366,008 | 1/1968 | Grandy | 89—1.5 |

SAMUEL W. ENGLE, Primary Examiner

U.S. Cl. X.R.

102—70